United States Patent [19]

Pearson, Jr. et al.

[11] Patent Number: 4,839,805
[45] Date of Patent: Jun. 13, 1989

[54] DUAL CONTROL OF IMAGE LEVEL AND WINDOW PARAMETERS OF A DISPLAY AND THE LIKE

[75] Inventors: Phil E. Pearson, Jr., Milwaukee; Arthur K. Collins, Waukesha, both of Wis.

[73] Assignee: General Electric Company, Milwaukee, Wis.

[21] Appl. No.: 552,665

[22] Filed: Nov. 17, 1983

[51] Int. Cl.⁴ .................. G05G 9/00; H03K 29/00
[52] U.S. Cl. .................. 364/413.14; 340/709; 74/471 XY; 364/413.22
[58] Field of Search .......... 364/414, 190; 340/709, 340/710, 703, 729, 749, 731; 74/471 XY

[56] References Cited

U.S. PATENT DOCUMENTS

| | | | |
|---|---|---|---|
| 3,541,521 | 11/1970 | Koster | 340/710 |
| 3,729,129 | 4/1973 | Fletcher et al. | 364/190 |
| 3,988,556 | 10/1976 | Hyodo | 273/148 B |
| 4,122,518 | 10/1978 | Castleman et al. | 364/190 |
| 4,124,787 | 11/1978 | Aamoth et al. | 273/148 B |
| 4,209,948 | 7/1980 | Obear | 51/91 R |
| 4,223,257 | 9/1980 | Miller | 364/190 |
| 4,245,244 | 1/1981 | Lijewski | 358/111 |
| 4,259,725 | 3/1981 | Andrews et al. | 340/709 X |
| 4,454,507 | 6/1984 | Srinivasan et al. | 340/709 X |
| 4,458,226 | 7/1984 | Cho | 273/148 B |
| 4,465,908 | 8/1984 | Griffith et al. | 273/148 B |
| 4,492,830 | 1/1985 | Kim | 273/148 B |
| 4,500,867 | 2/1985 | Ishitobi et al. | 273/148 B |
| 4,559,557 | 12/1985 | Keyes et al. | 358/111 |
| 4,563,740 | 1/1986 | Blake et al. | 364/413.22 |
| 4,583,186 | 4/1986 | Davis et al. | 358/80 X |
| 4,786,892 | 11/1988 | Kubo et al. | 74/471 XY |
| 4,993,992 | 1/1985 | Geller | 340/709 X |

OTHER PUBLICATIONS

*The Art of Electronics:* Paul Horowitz et al., Cambridge /. Press., 1980.

Primary Examiner—Jerry Smith
Assistant Examiner—Charles B. Meyer
Attorney, Agent, or Firm—Flehr, Hohbach, Test, Albritton & Herbert

[57] ABSTRACT

Dual control of image level and window of a display is accomplished by rotation of a single trackball. Rotation of the trackball within a first band including the X axis controls one parameter, and rotation of the trackball in a second band including the Y axis controls a second parameter. No changes are made in the parameters in response to rotation of the trackball in a third deadband laying between the first band and second band. The operator of a tomography system can readily change display parameters by rotation of the trackball while viewing the display.

6 Claims, 3 Drawing Sheets

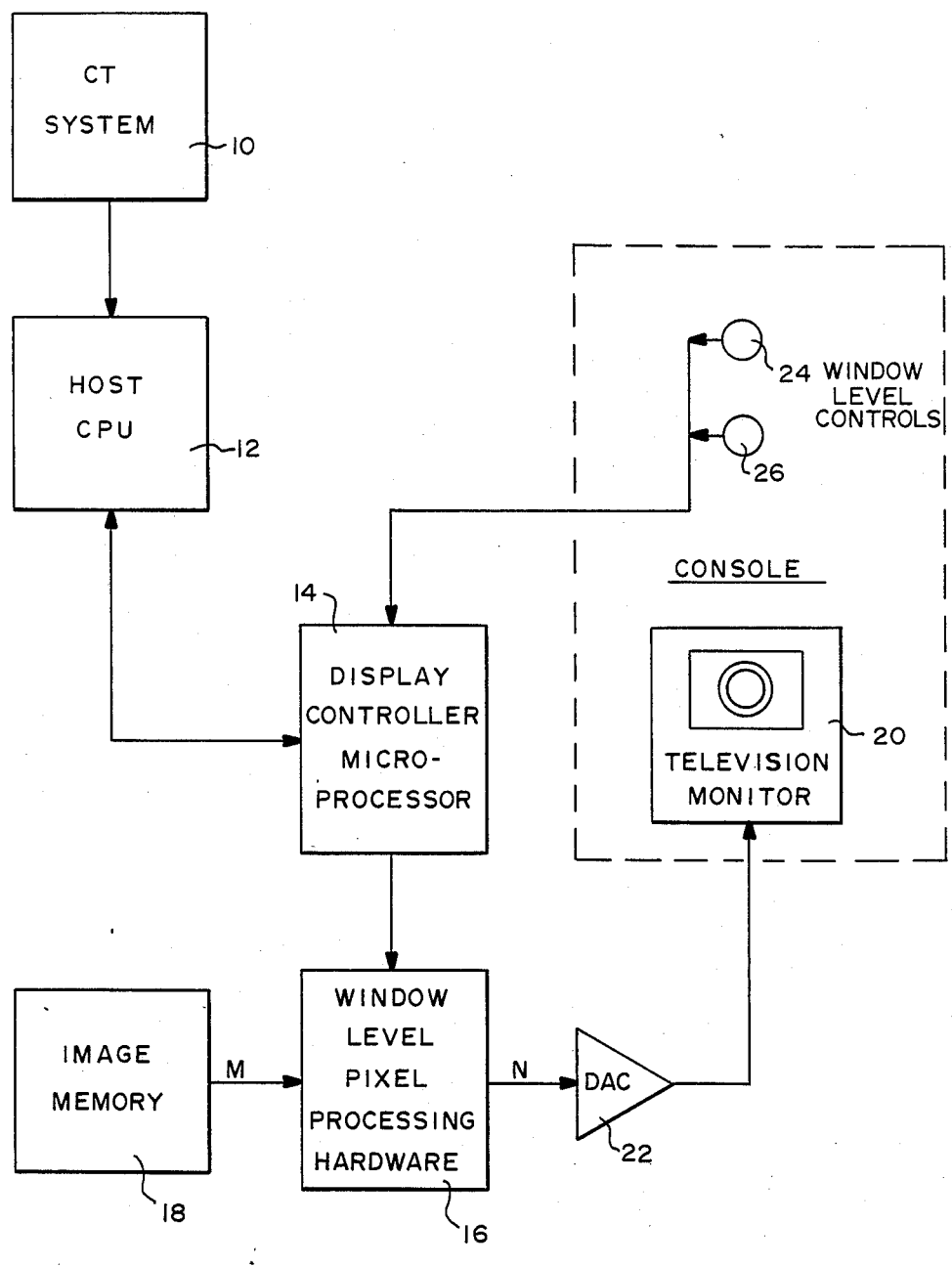
FIG. — 1

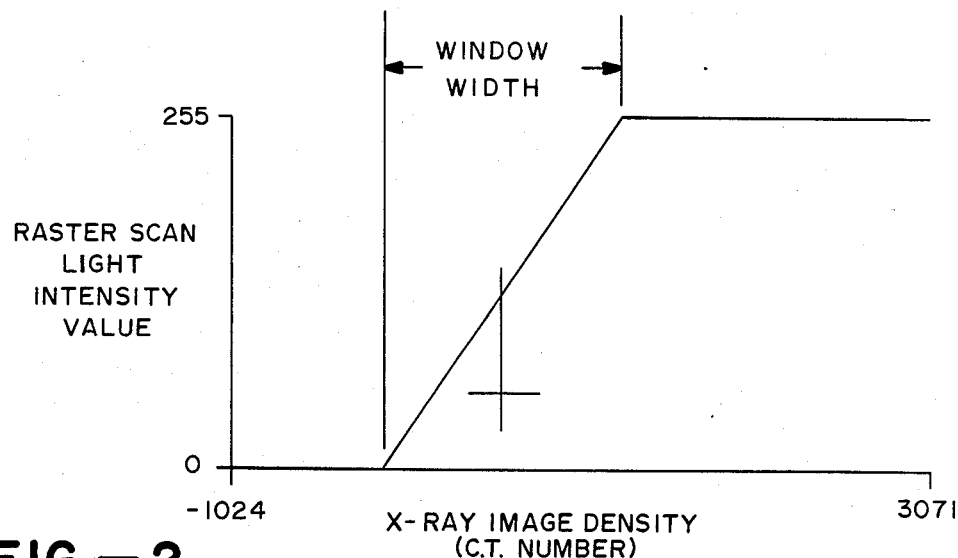
FIG.—2
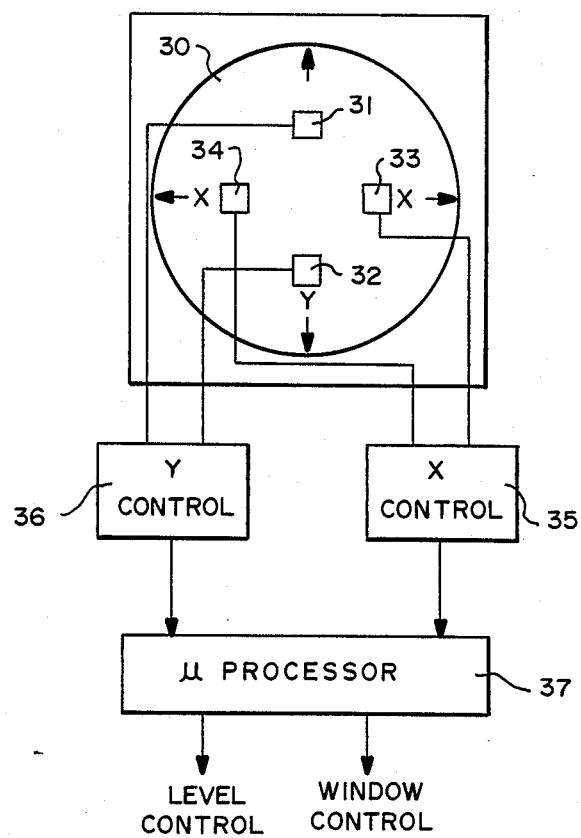
FIG.—3

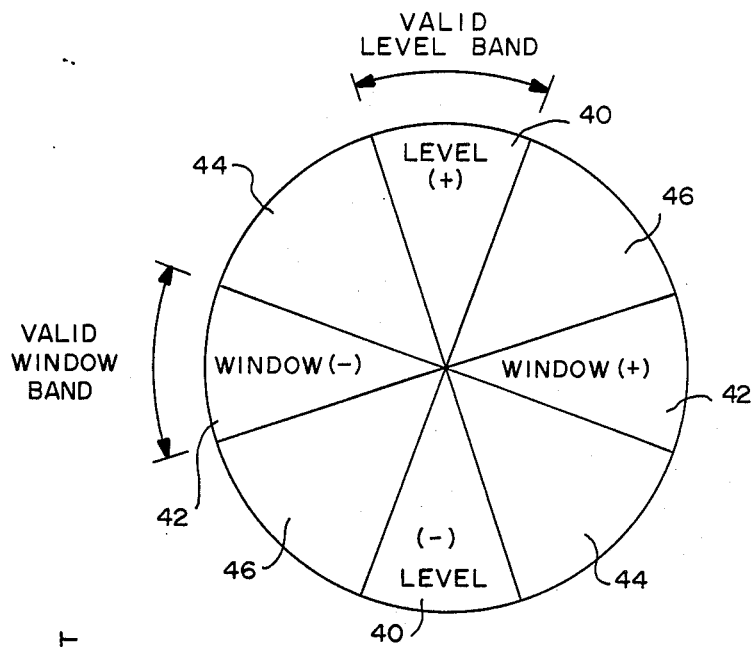
FIG.—4
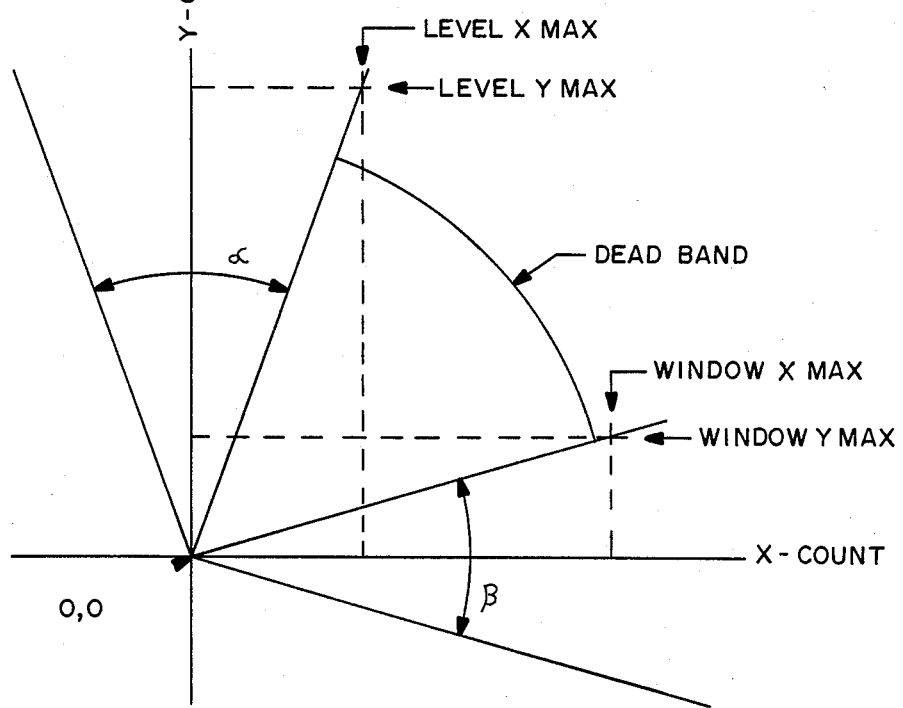
FIG.—5

DUAL CONTROL OF IMAGE LEVEL AND WINDOW PARAMETERS OF A DISPLAY AND THE LIKE

This invention relates generally to the control of video display parameters and the like, and more particularly the invention relates to a method and means for automatically controlling display parameters using a trackball control.

In computed tomography, cross sectional images are formed based on the reconstruction of data from the attenuation of waves, typically x-rays, passing through a body along a plurality of paths. The attenuation of the waves is expressed in CT values which can vary from 0 to 4095 in the General Electric 9800-CT system. CT numbers are proportional to the x-ray attenuation by small volume elements in the body being scanned with the x-ray beam.

The CT values are displayed on a cathode ray tube as levels of gray. However, the conventional video display is capable of displaying only about 256 gray levels between a black level and a white level. Accordingly, it has been the practice to select from a large range of CT values a limited range called a window and to display picture elements having CT values within the window over the gray scale capability of the CRT. For example, CT values above the upper window limit can be white and those below the lower window can be black. See, for example, U.S. Pat. No. 4,105,922 for "CT Number Identifier In A Computed Tomography System."

An operator control called LEVEL is provided in a CT display system to establish the center of a selected window of CT values to be displayed on the image monitor. This can cause pixel values equal to the level setting to be displayed as middle Gray while CT values greater than the upper limit of the window will be displayed as white pixels and CT values less than the lower limit are displayed as black pixels. Intermediate CT values are then displayed as various shades of gray depending upon their relative position within the selected window.

Another operator control called WINDOW establishes the width or span of CT numbers to be displayed on the image monitor. With a wider window more CT numbers are displayed, whereas with narrower windows fewer CT numbers are displayed. For example, narrow windows are used to investigate tissue areas such as the brain to detect small variations in density. Wide windows are used to investigate boney structures where there are wide variations of density.

The manually operated level control must have sufficient range of speed for a desired value to be quickly reached with a minimum of effort. Disclosed in copending application A-39909 for "Method and Means for Automatically Variably Controlling Display Parameters" is apparatus which is readily implemented using a trackball for LEVEL or WINDOW control. As is well known, the trackball is the equivalent of an electronic joy stick and comprises a smooth ball which is supported for revolving in all directions in a socket in a control console. A hemisphere of the ball is exposed so that an operator may rotate the ball by finger touch and watch the line or outline develop on the display screen. The concealed hemisphere of the ball rests on at least a pair of rollers which drive X and Y encoders. The encoders produce trains of electric pulses when the ball is turned.

In accordance with the present invention a manually operated trackball is used for both LEVEL and WINDOW control functions. In one embodiment, a vertical movement controls LEVEL and horizontal movement controls WINDOW or width.

In accordance with a feature of the invention, exact rotation of the trackball horizontally and vertically is not required. Movement of the trackball within a generally vertical angle or band controls LEVEL, and movement of the trackball within a generally horizontal angle or band controls WINDOW. The two bands are separated by a dead band in which neither function is controlled. Thus, the human operator can operate the trackball while viewing the display since exact rotation direction is not required.

The invention and objects and features thereof will be more readily apparent from the following detailed description and appended claims when taken with the drawing, in which:

FIG. 1 is a functional block diagram of conventional display control apparatus as used in a computed tomography (CT) system.

FIG. 2 is a plot illustrating the controls of display level and display window within the system of FIG. 1.

FIG. 3 is a schematic representation of a trackball control for use in controlling level parameter and window parameter in accordance with the present invention.

FIG. 4 is a schematic representation of level and window control using the trackball of FIG. 3.

FIG. 5 is a plot illustrating the bands of movement for WINDOW control and LEVEL control and the deadband therebetween.

Referring now to the drawings, FIG. 1 is a functional block diagram of a portion of a display apparatus for use with a CT system, for example. The CT system 10 includes a patient table, radiation source, and radiation detectors which are controlled by a host computer 12. Data from the detectors is provided by the host computer 12 in digital form as CT numbers to the display controller microprocessor 14 which applies the CT data to processing hardware 16 and directly to a memory 18 for storage and for control of a television monitor 20 through digital to analog converter 22. The microprocessor 14 receives inputs from two manually operated switches 24 and 26 which control the window level and window width of the displayed image.

The window and level control is further illustrated in the plot of FIG. 2 in which the 4096 CT numbers are mapped to the 256 raster scan line intensity values. The window function is used to expand or compress the Gray scale around a given CT value. With a wider window, more CT numbers are displayed. Narrower windows display fewer CT numbers. The level function is used to determine the center value of the window. The setting of this control depends on the average density of anatomy the user wishes to investigate. For example, bone is dense and must have a higher CT number than tissue. Therefore, a higher level setting would be used.

In accordance with the present invention the conventional detented multipositional switch for window control and the shaft encoder for LEVEL control are replaced by a single trackball control. As illustrated in the functional block diagram of FIG. 3, associated with the trackball 30 are a plurality of rollers and encoders 31–34. For example, the encoder 31 generates +Y pulses when the ball 30 is rotated upwardly and roller 32 generated −Y pulses when the ball 30 is rotated downwardly. Encoder 33 generates +X pulses when the ball is rotated horizontally to the right, and encoder 34 generates −X pulses when the ball is moved horizontally to the left. It will be appreciated that when the ball is moved in any quadrant, both X and Y pulses can be generated. Rather than using four encoders, it will be appreciated that a single X encoder and a single Y encoder could suffice. The cumulative X pulses are counted by a counter 35, and the cumulative Y pulses are counted by a counter 36. The X and Y counts are applied to microprocessor 37.

In accordance with the invention movement of a trackball in a vertical band is used to control one display parameter, and movement of the trackball in a horizontal band is used to control the other parameter. A deadband is provided between the vertical and horizontal bands.

Trackball motion will cause a microcomputer interrupt to occur. To minimize undesirable interference between control of WINDOW and LEVEL, the dead bands are provided between the LEVEL (e.g. vertical) and WINDOW (e.g. horizontal) control motions. This allows the human operator to use the trackball for both LEVEL and WINDOW control while viewing the displayed image. This is illustrated in FIG. 4 of the drawing in which rotation of the trackball in the band 40 controls the level parameter, and movement of the trackball in the band 42 controls the window parameter. The bands 44 and 46 therebetween are dead zones, and any rotation of the trackball in these bands will not produce any change in either LEVEL or WINDOW. The dead bands permit control of the two variables without undesirable interference between control of WINDOW and LEVEL.

The several bands illustrated in FIG. 4 are determined by X and Y counts. The direction of trackball rotation is determined by keeping a running total of X counts and Y counts. A positive X or Y count will decrement the respective sum, and a negative X or Y count would decrement the respective sum. When the magnitude of either sum reaches a predetermined maximum count, the direction of trackball rotation is validated by comparing the other sum with another predetermined maximum count. The actual values of the maximum counts define the angle of the live bands and dead bands.

This is further illustrated in FIG. 5. The operable Level control band is defined by an angle alpha as follows:

$$\alpha = 2 \tan^{-1} \frac{\text{Level } X \text{ max.}}{\text{Level } Y \text{ max.}}$$

Similarly, the operable band for the window control is defined by an angle beta as follows:

$$\beta = 2 \tan^{-1} \frac{\text{Window } Y \text{ max.}}{\text{Window } X \text{ max.}}$$

Thus, when the operator is moving the trackball vertically and the Y count reaches the Level Y max, the X count is checked to see if it exceeds Level X max. If not, then the trackball is operating in an operable band for Level control. Alternatively, if the X count exceeds the Level X max, then the trackball is operating in a dead band and no change in parameters is made.

Similarly, when the trackball is moving for a Window control and the X count reaches Window X max, the Y count is checked. If the Y count exceeds Window Y max, then the trackball is operating in the deadband and no change is made in either parameter. No WINDOW or LEVEL changes occur when the trackball is rotated in the deadbands.

A timer function can be provided which occurs at a 60 Hertz rate, for example. The timer routine functions to reset the trackball counts if the trackball has not moved for a certain amount of time. Graphically, this resets the current vector end point to the origin (0,0) as illustrated in FIG. 5.

The present invention allows both WINDOW and LEVEL parameters to be controlled by one trackball. This permits the operator to view the display and not have to look down at the window level controls. No hand position change is required to control both WINDOW and LEVEL.

While the invention has been described with reference to a specific embodiment, the description is illustrative of the invention and is not to be construed as limiting the invention. For example, control of a parameter can be in response to the X or Y count rather than to the cumulative X and Y counts. Either hardware or firmware can be used to implement the invention. Thus, various other modifications and applications may occur to those skilled in the art without departing from the true spirit and scope of the invention as defined by the appended claims.

What is claimed is:

1. Apparatus for controlling two parameters comprising a trackball for generating an X count in response to rotation of said trackball along an X axis and for generating a Y count in response to rotation of said trackball along a Y axis, and control means responsive to said X count and said Y count for controlling a first parameter when said trackball is rotated in a first band including said X axis and for controlling a second parameter when said trackball is rotated in a second band including said y axis, said control means being non-responsive to rotation of said trackball in a third band lying between said first band and said second band.

2. Apparatus for controlling image level and window parameters in a computed tomography display comprising:

a trackball including an X encoder for generating an X count in response to rotation of said trackball along an X axis and including a Y encoder for generating a Y count in response to rotation of said trackball along a Y axis, and control means responsive to rotation of said trackball for controlling said level and window parameters, said control means responsive to rotation of said trackball within a first band including said X axis and to counts generated in response thereto for controlling one of said parameters, said control means responsive to rotation of said trackball within a second band including said Y axis and to counts generated in response thereto for controlling the other of said parameters, and said control means responsive to rotation of said trackball within a third band for inhibiting change in said parameters, said third band being positioned between said first band and said second band.

3. Apparatus as defined by claim 2 wherein said control means is responsive to a combined X count and Y count in controlling said parameters.

4. Apparatus as defined by claim 2 wherein said control means is responsive to said X count and said Y count in controlling said parameters.

5. Apparatus as defined by claim 2 wherein said first band is defined by $$2 \tan^{-1} \frac{X \text{ count max. 1}}{Y \text{ count max. 1}}$$

where X count max. 1 is an accumulated X count and Y count max. 1 is the accumulated Y count when Y count max. 1 is reached.

6. Apparatus as defined by claim 5 wherein said second band is defined by $$2 \tan^{-1} \frac{Y \text{ count max. 2}}{X \text{ count max. 2}}$$

where Y count max. 2 is an accumulated Y count and X count max. 2 is the accumulated X count when X count max. 2 is reached.

* * * * *